US012682312B2

(12) United States Patent
Sheshansh et al.

(10) Patent No.: US 12,682,312 B2
(45) Date of Patent: Jul. 14, 2026

(54) SYSTEMS AND METHODS FOR PRIORITIZING ORDERS

(71) Applicant: Dell Products L.P., Round Rock, TX (US)

(72) Inventors: Satyam Sheshansh, Bangalore (IN); Dhiraj Balakrishnan, Chennai (IN); Balaji Singh Mahendranath Singh, Chennai (IN); Durga Ram Singh Bondili, Chennai (IN)

(73) Assignee: Dell Products L.P., Round Rock, TX (US)

( * ) Notice: Subject to any disclaimer, the term of this patent is extended or adjusted under 35 U.S.C. 154(b) by 589 days.

(21) Appl. No.: 17/663,500

(22) Filed: May 16, 2022

(65) Prior Publication Data

US 2023/0368130 A1 Nov. 16, 2023

(51) Int. Cl.
| | |
|---|---|
| *G06Q 10/087* | (2023.01) |
| *G06F 17/18* | (2006.01) |
| *G06N 20/00* | (2019.01) |
| *G06Q 30/0601* | (2023.01) |

(52) U.S. Cl.
CPC ........... *G06Q 10/087* (2013.01); *G06F 17/18* (2013.01); *G06N 20/00* (2019.01); *G06Q 30/0635* (2013.01)

(58) Field of Classification Search
USPC ...................................................... 705/7.26
See application file for complete search history.

(56) References Cited

U.S. PATENT DOCUMENTS

| | | | | |
|---|---|---|---|---|
| 11,599,927 | B1 * | 3/2023 | Flunkert ................. | G06F 40/30 |
| 2007/0244765 | A1 * | 10/2007 | Hunter ................. | G06Q 10/087 |
| | | | | 705/26.81 |
| 2014/0343711 | A1 * | 11/2014 | Aqlan .............. | G05B 19/41865 |
| | | | | 700/101 |
| 2018/0240181 | A1 * | 8/2018 | Lopez .................... | G06Q 10/00 |
| 2020/0218987 | A1 * | 7/2020 | Jiang ........................ | G06N 5/01 |
| 2021/0073896 | A1 * | 3/2021 | Soeseno .............. | G06N 3/0499 |
| 2021/0081865 | A1 * | 3/2021 | Darmour .......... | G06Q 10/06315 |
| 2021/0383254 | A1 * | 12/2021 | Renders .............. | G06N 3/0499 |
| 2022/0245573 | A1 * | 8/2022 | Zhang .................... | G06Q 10/04 |
| 2022/0343399 | A1 * | 10/2022 | Filipovich ............. | G06Q 10/00 |

OTHER PUBLICATIONS

Chan et al., Optimization of Order Fulfillment in Distribution Network Problems, Springer, pp. 307-319 (Year: 2004).*

* cited by examiner

*Primary Examiner* — Allison M Neal
(74) *Attorney, Agent, or Firm* — DALY, CROWLEY, MOFFORD & DURKEE, LLP

(57) ABSTRACT

In one aspect, an example methodology implementing the disclosed techniques includes, by an order prioritization service, receiving information regarding orders that need to be fulfilled and determining, for each one of the orders, one or more relevant features from the information regarding the order, the one or more relevant features influencing prediction of an order priority. The method also includes, by the order prioritization service, predicting, using a machine learning (ML) model, a priority score for each one of the orders based on the determined one or more relevant features, and ranking the orders based on their respective priority scores.

15 Claims, 6 Drawing Sheets

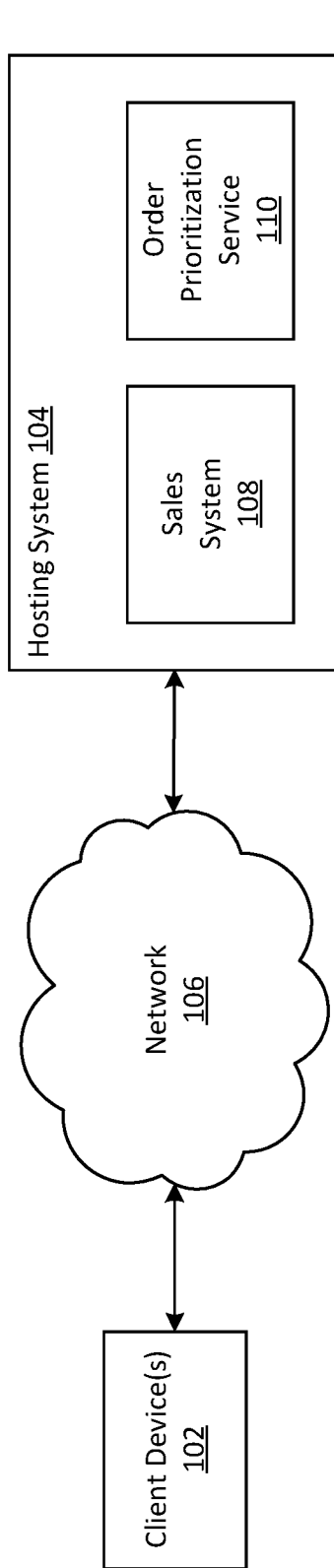
FIG. 1A

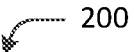
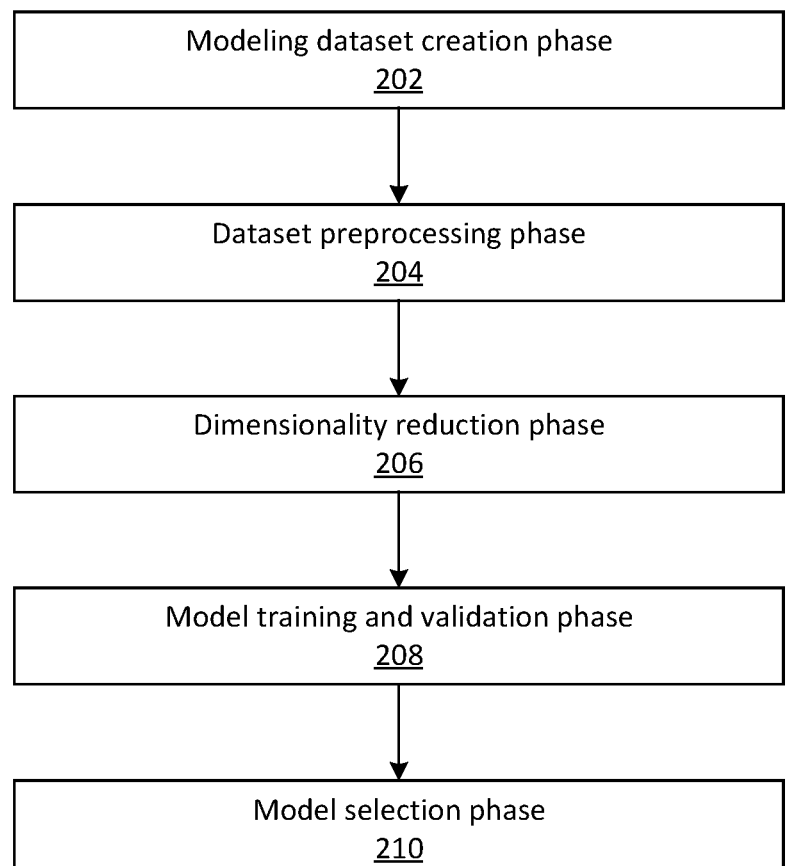
FIG. 2

300

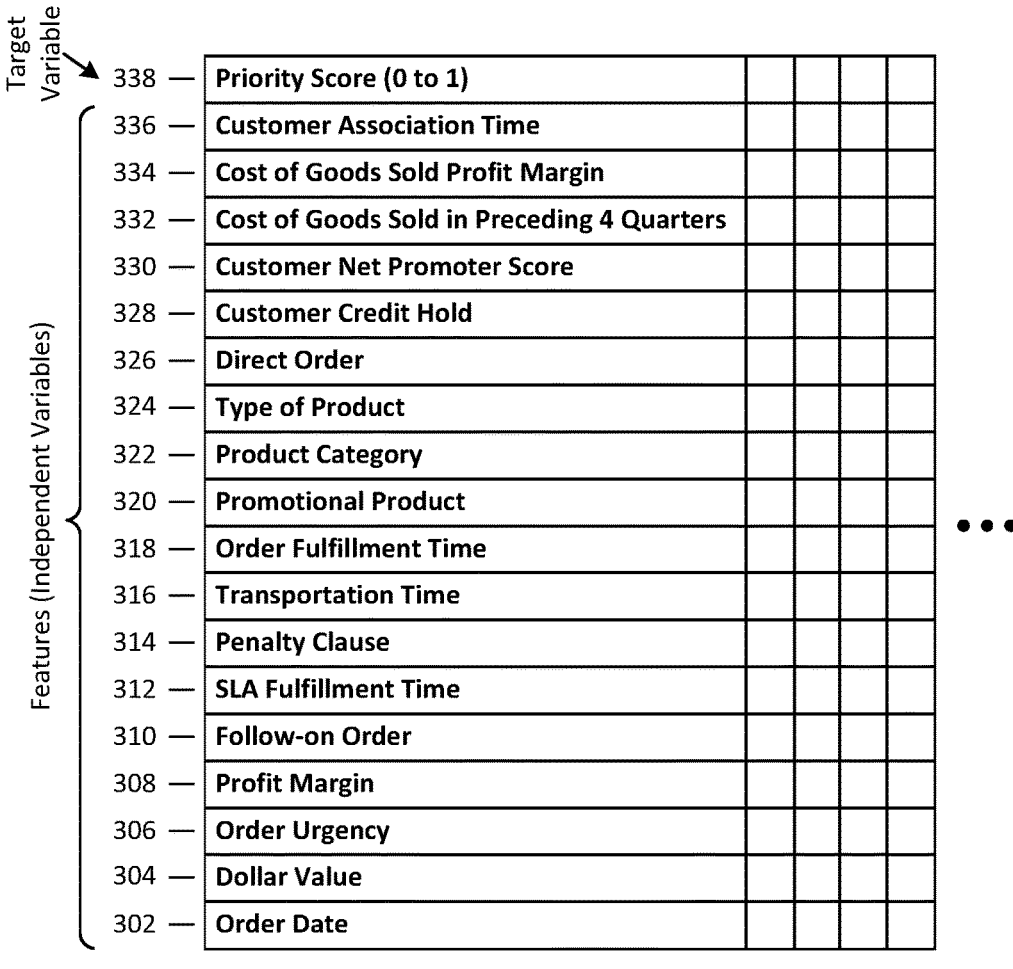

Target Variable

Features (Independent Variables)

| 338 — | Priority Score (0 to 1) | | | | |
|---|---|---|---|---|---|
| 336 — | Customer Association Time | | | | |
| 334 — | Cost of Goods Sold Profit Margin | | | | |
| 332 — | Cost of Goods Sold in Preceding 4 Quarters | | | | |
| 330 — | Customer Net Promoter Score | | | | |
| 328 — | Customer Credit Hold | | | | |
| 326 — | Direct Order | | | | |
| 324 — | Type of Product | | | | |
| 322 — | Product Category | | | | |
| 320 — | Promotional Product | | | | |
| 318 — | Order Fulfillment Time | | | | |
| 316 — | Transportation Time | | | | |
| 314 — | Penalty Clause | | | | |
| 312 — | SLA Fulfillment Time | | | | |
| 310 — | Follow-on Order | | | | |
| 308 — | Profit Margin | | | | |
| 306 — | Order Urgency | | | | |
| 304 — | Dollar Value | | | | |
| 302 — | Order Date | | | | |

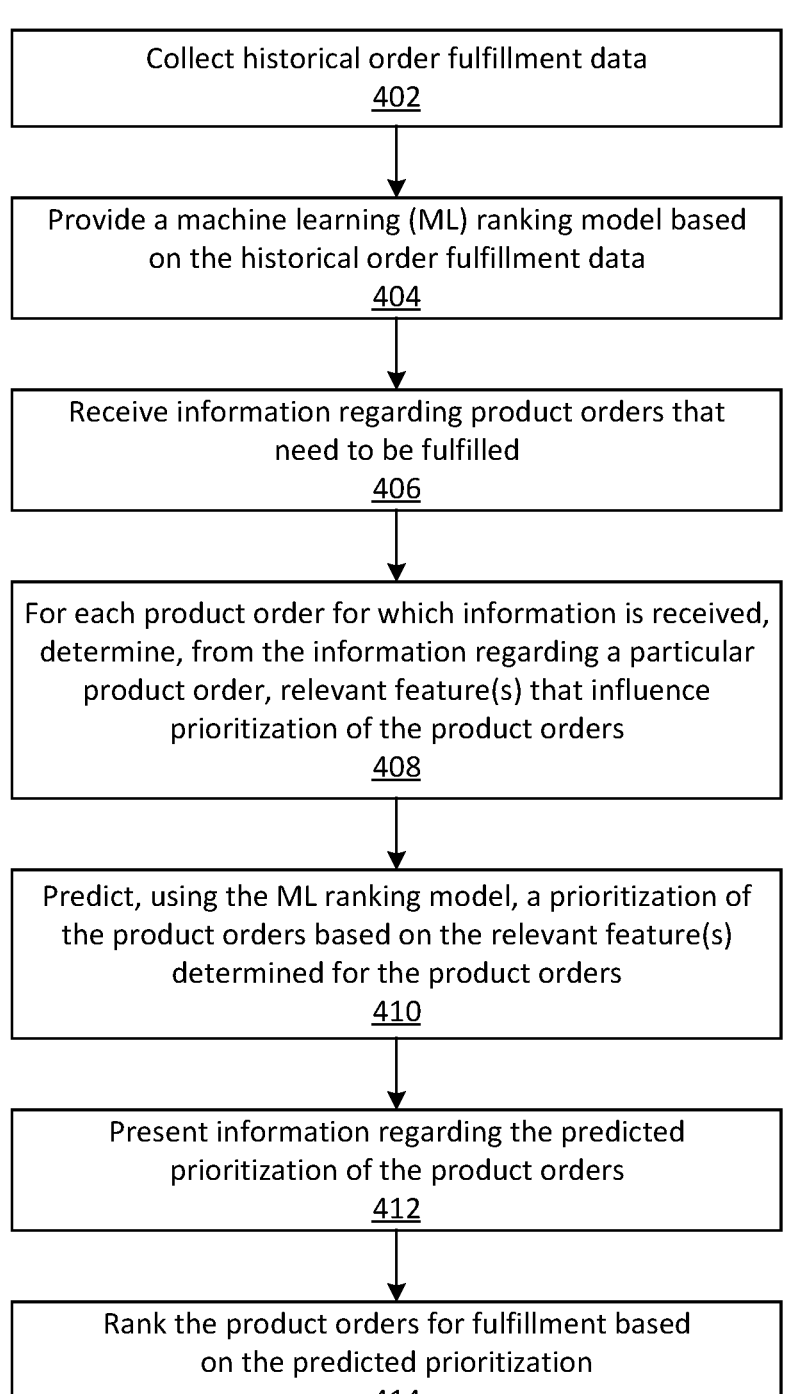

Collect historical order fulfillment data
402

Provide a machine learning (ML) ranking model based
on the historical order fulfillment data
404

Receive information regarding product orders that
need to be fulfilled
406

For each product order for which information is received,
determine, from the information regarding a particular
product order, relevant feature(s) that influence
prioritization of the product orders
408

Predict, using the ML ranking model, a prioritization of
the product orders based on the relevant feature(s)
determined for the product orders
410

Present information regarding the predicted
prioritization of the product orders
412

Rank the product orders for fulfillment based
on the predicted prioritization
414

FIG. 4

SYSTEMS AND METHODS FOR PRIORITIZING ORDERS

BACKGROUND

Organizations, such as companies, enterprises, and manufacturers, continually grapple with having to prioritize customer orders for fulfillment. For example, an organization may be confronted with a high volume of customer orders for the organization's products during certain periods such as end of quarter/end of year (EOQ/EOY). However, the organization may have various manufacturing constraints, such as capacity constraints and supply constraints, which may not allow the organization to fulfill the high volume of orders in a timely manner to the satisfaction of both the customer and the organization. This situation is compounded where the orders involve high dollar values, strict service-level agreements (SLAs), and custom or made-to-order products.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by an order prioritization service, receiving information regarding a plurality of orders that need to be fulfilled and determining, for each one of the orders, one or more relevant features from the information regarding the order, the one or more relevant features influencing prediction of an order priority. The method also includes, by the order prioritization service, predicting, using a machine learning (ML) model, a priority score for each one of the plurality of orders based on the determined one or more relevant features, and ranking the plurality of orders based on their respective priority scores.

In some embodiments, the ML model includes a multi-layer perceptron (MLP).

In some embodiments, the ML model is trained using a modeling dataset generated from a corpus of historical order fulfillment data of an organization.

In some embodiments, the ML model is trained using supervised learning with historical order fulfillment data including an actual priority of each order.

In some embodiments, the ML model includes a pairwise ranking model. In one aspect, the pairwise ranking model includes a gradient boosting forest.

In some embodiments, the ML model includes a pointwise ranking model. In one aspect, the pointwise ranking model includes one of a linear regression model or a multiple regression model.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process corresponding to the aforementioned method or any described embodiment thereof.

According to another illustrative embodiment provided to illustrate the broader concepts described herein, a non-transitory machine-readable medium encodes instructions that when executed by one or more processors cause a process to be carried out, the process corresponding to the aforementioned method or any described embodiment thereof.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 1A is a block diagram of an illustrative network environment for prioritization of orders for fulfillment, in accordance with an embodiment of the present disclosure.

FIG. 2 shows an illustrative workflow for a model building process, in accordance with an embodiment of the present disclosure.

FIG. 3 is a diagram illustrating a portion of a data structure that can be used to store information about relevant features of a modeling dataset for training a machine learning (ML) ranking model to prioritize input product orders, in accordance with an embodiment of the present disclosure.

FIG. 4 is a flow diagram of an example process for ranking product orders for fulfillment based on a predicted prioritization of the product orders, in accordance with an embodiment of the present disclosure.

DETAILED DESCRIPTION

Figure 1B:
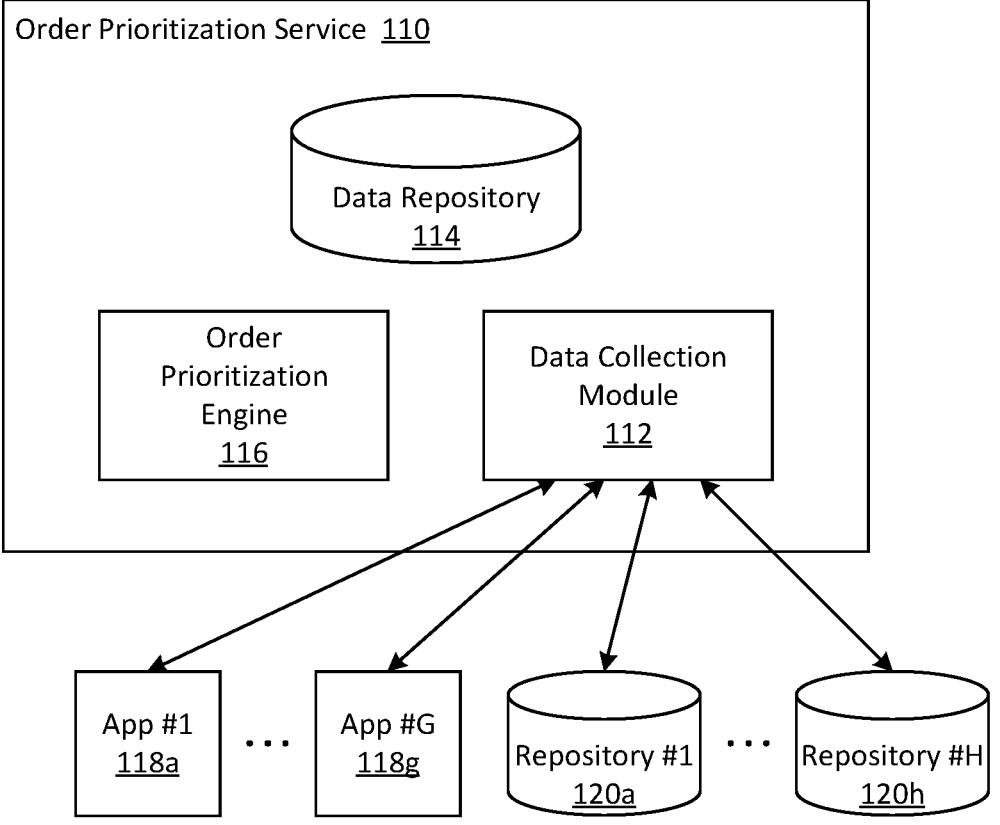
FIG. 1B is a block diagram of an illustrative order prioritization service, in accordance with an embodiment of the present disclosure.

Organizations often resort to prioritizing orders based only on dollar value and service level agreement (SLA) and fail to take into account many of the factors that influence the importance of orders to the organization. For example, a high dollar value order from a customer with an existing SLA with the organization may be given priority (e.g., escalated) over a lower dollar value order from a different customer without an existing relationship with the organization. As another example, an employee (e.g., sales associate) of the organization may subjectively prioritize one order over another order. Even when existing enterprise resource planning (ERP) and supply chain management (SCM) systems are used, these systems fail to consider many of the factors that influence order prioritization and, hence, provide inaccurate results. This inability to properly prioritize orders for fulfillment can lead to customer dissatisfaction as well as reduced business opportunities for the organization.

Certain embodiments of the concepts, techniques, and structures disclosed herein are directed to an artificial intelligence (AI)/machine learning (ML)-powered framework for prioritization of product orders (sometimes referred to herein more simply as "orders") for fulfillment. The orders may be customer orders for an organization's products, and which need to be fulfilled by the organization. In some embodiments, a ranking-based ML algorithm can be trained using machine learning techniques to predict a prioritization of the organization's orders for fulfillment. For example, in one embodiment, a ranking-based ML algorithm (e.g., a pairwise ranking algorithm or a pointwise ranking algorithm) may be trained using a modeling dataset generated from the organization's historical product orders and their fulfillment and customer information. For a particular historical product order, such information may include dollar value, SLA timeframe, product category, customer's business history, credit history, order profit margin, delivery time to a specified ship-to location, delivery date commitment, order urgency, whether the product associated with the order is a promoted product, and customer's long-standing association with the organization, to provide some examples. Once the ranking-based algorithm is trained, the ML ranking model can, in response to input of the organization's orders that need to be fulfilled (i.e., input of information about the organization's orders that need to be fulfilled), predict a prioritization of the orders. The organization can then rank (or "queue") the orders for fulfillment based on the predicted prioritization.

Turning now to the figures, FIG. 1A is a block diagram of an illustrative network environment 100 for prioritization of orders for fulfillment, in accordance with an embodiment of the present disclosure. As illustrated, network environment 100 may include one or more client devices 102 communicatively coupled to a hosting system 104 via a network 106. Client devices 102 can include smartphones, tablet computers, laptop computers, desktop computers, workstations, or other computing devices configured to run user applications (or "apps"). In some implementations, client devices 102 may be substantially similar to a computing device 500, which is further described below with respect to FIG. 5.

Hosting system 104 can include one or more computing devices that are configured to host and/or manage applications and/or services. Hosting system 104 may include load balancers, frontend servers, backend servers, authentication servers, and/or any other suitable type of computing device. For instance, hosting system 104 may include one or more computing devices that are substantially similar to computing device 500, which is further described below with respect to FIG. 5.

In some embodiments, hosting system 104 can be provided within a cloud computing environment, which may also be referred to as a cloud environment, cloud computing or cloud network. The cloud computing environment can provide the delivery of shared computing services (e.g., microservices) and/or resources to multiple users or tenants. For example, the shared resources and services can include, but are not limited to, networks, network bandwidth, servers, processing, memory, storage, applications, virtual machines, databases, software, hardware, analytics, and intelligence.

As shown in FIG. 1A, hosting system 104 may include a sales system 108 and an order prioritization service 110. Sales system 108 is generally configured to provide services of product order entry and processing for organizations. For example, employees (e.g., sales associates) and others associated with an organization's sales team may use the various applications and/or processes of sales system 108 to manage sales opportunities including book product orders, track product orders, perform administrative tasks, and manage sales leads, among others. In one embodiment, sales system 108 can be used to send (or "transmit") a request to prioritize product orders to order prioritization service 110. For example, a user (e.g., a sales associate) can use their client device 102 to access sales system 108 can issue a request to prioritize product orders to order prioritization service 110. The product orders specified in the request may be customer orders that need to be fulfilled by the organization. Sales system 108 can receive a response to the issued request (e.g., a prioritization of the product orders specified in the request) and present the response within a user interface (UI) of sales system 104 (e.g., a graphical user interface) for viewing by the user. The user can then take appropriate action based on the response. For example, the user may use the UI of sales system 108 to rank the product orders for fulfillment based on the prioritization of the product orders. As described in further detail at least with respect to FIGS. 1B-4, order prioritization service 110 is generally configured to provide a framework for prioritizing product orders for fulfillment by the organization.

Network 106 may correspond to one or more wireless or wired computer networks including, but not limited to, local-area networks (LANs), metropolitan area networks (MANs), wide area networks (WANs), wireless local-area networks (WLAN), primary public networks, primary private networks, cellular networks, Wi-Fi (i.e., 802.11) networks, Bluetooth networks, the Internet, and/or any other suitable type of communications network. In some embodiments, network 106 may include another network or a portion or portions of other networks.

FIG. 1B is a block diagram of an illustrative order prioritization service 110, in accordance with an embodiment of the present disclosure. An organization such as a company, an enterprise, or other entity that manufactures and/or sells products (e.g., electronic devices), for instance, may implement and use the framework of order prioritization service 110 to intelligently prioritize and queue customer orders for fulfillment by the organization. Order prioritization service 110 can be implemented as computer instructions executable to perform the corresponding functions disclosed herein. Order prioritization service 110 can be logically and/or physically organized into one or more components. The various components of order prioritization service 110 can communicate or otherwise interact utilizing application program interfaces (APIs), such as, for example, a Representational State Transfer (RESTful) API, a Hypertext Transfer Protocol (HTTP) API, or another suitable API, including combinations thereof.

In the example of FIG. 1B, order prioritization service 110 includes a data collection module 112, a data repository 114, and an order prioritization engine 116. Order prioritization service 110 can include various other components (e.g., software and/or hardware components) which, for the sake of clarity, are not shown in FIG. 1B. It is also appreciated that order prioritization service 110 may not include certain of the components depicted in FIG. 1B. For example, in certain embodiments, order prioritization service 110 may not include one or more of the components illustrated in FIG. 1B, but order prioritization service 110 may connect or otherwise couple to the one or more components via a communication interface. Thus, it should be appreciated that numerous configurations of order prioritization service 110 can be implemented and the present disclosure is not intended to be limited to any particular one. That is, the degree of integration and distribution of the functional component(s) provided herein can vary greatly from one embodiment to the next, as will be appreciated in light of this disclosure.

Referring to order prioritization service 110, data collection module 112 is operable to collect or otherwise retrieve the organization's historical product orders and their fulfillment and customer information from one or more data sources. The data sources can include, for example, one or more applications 118a-118g (individually referred to herein as application 118 or collectively referred to herein as applications 118) and one or more repositories 120a-120h (individually referred to herein as repository 120 or collectively referred to herein as repositories 120). Applications 118 can include various types of applications such as software as a service (SaaS) applications, web applications, and desktop applications, to provide a few examples. In some embodiments, applications 118 may correspond to the organization's enterprise applications such as an order management (OM) application, an order fulfillment application, and/or a supply chain management (SCM) application. Repositories 120 can include various types of data repositories such as conventional file systems, cloud-based storage services such as SHAREFILE, BITBUCKET, DROPBOX, and MICROSOFT ONEDRIVE, and web servers that host files, documents, and other materials. In some embodiments, repositories 120 may correspond to the organization's repositories used for storing at least some of the historical product orders and their fulfillment and customer information.

Data collection module 112 can utilize application programming interfaces (APIs) provided by the various data sources to collect information and materials therefrom. For example, data collection module 112 can use a REST-based API or other suitable API provided by an enterprise application/system to collect information therefrom (e.g., to collect the historical product orders and their fulfillment and customer information). In the case of web-based applications, data collection module 112 can use a Web API provided by a web application to collect information therefrom. As another example, data collection module 112 can use a file system interface to retrieve the files containing historical product orders and their fulfillment and customer information, etc., from a file system. As yet another example, data collection module 112 can use an API to collect documents containing historical product orders and their fulfillment and customer information, etc., from a cloud-based storage service. A particular data source (e.g., an enterprise application/system and/or data source) can be hosted within a cloud computing environment (e.g., the cloud computing environment of order prioritization service 110 or a different cloud computing environment) or within an on-premises data center (e.g., an on-premises data center of an organization that utilizes order prioritization service 110).

In cases where an application or data repository does not provide an interface or API, other means, such as printing and/or imaging, may be utilized to collect information therefrom (e.g., generate an image of printed document containing information/data about a historical product order, the historical order's fulfillment information, and/or the historical order's customer information). Optical character recognition (OCR) technology can then be used to convert the image of the content to textual data.

A particular data source (e.g., application 118 or repository 120) can be hosted within a cloud computing environment or within an on-premise data center (e.g., an on-premise data center of an organization that utilizes order prioritization service 110).

In some embodiments, data collection module 112 can collect information from one or more of the various data sources on a continuous or periodic basis (e.g., according to a predetermined schedule specified by the organization). Additionally or alternatively, data collection module 112 can collect information from one or more of the various data sources in response to an input. For example, a user, such as a sales associate of the organization, can use their client device 102 to access order prioritization service 110 can issue a request to retrieve information about a historical order(s) and their fulfillment and customer information form one or more data sources to order prioritization service 110. In some embodiments, data collection module 112 can store the information and materials collected from the various data sources within data repository 114. In some embodiments, data repository 114 may correspond to a storage service within the computing environment of order prioritization service 110.

Order prioritization engine 116 is operable to predict a prioritization of orders (e.g., customer orders) that need to be fulfilled by an organization. To this end, in some embodiments, order prioritization engine 116 can include a ranking-based ML algorithm that is trained and tested using machine learning techniques with a modeling dataset generated from the organization's historical product orders and their fulfillment and customer information. For example, in some such embodiments, the historical product orders and their fulfillment and customer information used to generate the modeling dataset may be collected by data collection module 112, as previously described herein. Once the ranking-based ML algorithm is trained, the trained ML ranking model can, in response to input of the organization's orders that need to be fulfilled (e.g., input of feature vectors that represent relevant features of the orders that need to be fulfilled), predict a prioritization of the orders based on the learned behaviors (or "trends") in the modeling dataset. For example, for the organization's orders for which prediction of a prioritization is desired, order prioritization engine 116 can use information regarding the orders to generate feature vectors that represent relevant features (or "attributes") of the orders, such as some or all of the variables that may influence the prediction of prioritization of the orders (e.g., some or all of the independent variables described below at least with respect to FIG. 3). The generated feature vectors can then be input to the ML ranking model which outputs a prediction of a prioritization of the orders. Further description of the training of the ranking-based ML algorithm implemented within order prioritization engine 116 is provided below at least with respect to FIG. 2.

In some embodiments, the ranking-based ML algorithm of order prioritization engine 116 includes a pointwise ranking algorithm. In brief, the pointwise ranking algorithm arranges the input orders (i.e., the organization's orders input to the ML ranking model for prediction) with respect to a priority score that was predicted for each of the orders by the ML ranking model. In one such embodiment, the pointwise ranking algorithm includes a linear regression algorithm. Linear regression is a predictive ML algorithm used for supervised learning. Linear regression performs the task to predict a dependent (or "target") variable (e.g., a priority score) based on a given independent variable. The linear regression technique provides (or "finds") a linear relationship between the dependent variable and the given independent variable.

In another such embodiment, the pointwise ranking algorithm includes a multiple regression algorithm. Multiple regression is an extension of linear regression. While linear regression predicts a dependent variable based on a single input (i.e., single independent variable), multiple regression performs the task to predict a dependent variable (e.g., a priority score) based on multiple inputs (e.g., two or more independent variables). An equation for multiple regression may take the following form:

$$y = B_1 * x_1 + B_2 * x_2 + B_3 * x_3 + \cdots + B_n * x_n + C$$

Where B denotes the list of coefficients for the independent variable and x denotes the values for each of the independent variables. C is the constant starting value of the dependent variable (y) when all the independent variables are zero. A loss function (e.g., root mean squared error) and an optimizer algorithm (e.g., gradient descent algorithm) can be specified for optimizing the multiple regression algorithm.

In some embodiments, the ranking-based ML algorithm of order prioritization engine 116 includes a pairwise ranking algorithm. In brief, the pairwise ranking algorithm compares two orders and ranks the two orders based on their priority. The pairwise ranking approaches employ a probabilistic cost function which considers a pair of orders in a dataset at a time in the loss function to learn how to rank the orders (e.g., to estimate which of the two orders is more relevant than the other). The goal of the loss function is to minimize the number of swaps (e.g., the number of inversions) required to correct an incorrect ordering of candidate orders. In some embodiments, the cost function may be implemented through a neural network such as, for example, an MLP or other suitable deep neural network, optimized by gradient descent.

In one embodiment, the pairwise ranking algorithm includes RankNet. RankNet is a two-layer (i.e., two-hidden-layer) neural network with on output node. The output value corresponds to a relevance of an order (e.g., a customer product order) to the set of orders, and the input layer can have N nodes, where N is equal to the number of independent variables in the input feature vector. The model (i.e., the trained neural network) takes as input the features of two orders and returns (i.e., outputs) the relevance of each of the orders. The orders in an input dataset (e.g., the orders that need to be fulfilled by the organization) can be ranked by arranging the orders in the dataset in descending order (or ascending order) based on their relevance. For example, the order with higher relevance can be pushed to the top in a priority list and the order with lower relevance can be pushed to the bottom of the priority list.

In some embodiments, the pairwise ranking algorithm includes LambdaMART. LambdaMART is the boosted tree version of LambdaRANK, which is based on RankNet. LambdaMART splits up the orders at each node based on their features and these splits continue until the bottom of the decision tree is reached. At its core, LambdaMART is a loss function ("Lambda") attached to a gradient boosting forest ("MART"—Multiple additive regression tree). A gradient boosting forest improves its predictions by training a new tree to predict the errors ("gradients" of the loss function) of the trees which came before. Predictions are made by summing the original estimate of the first tree with all corrections imposed by subsequent trees. For example, in one embodiment, LambdaMART can be implemented using Python and modules such as Panda, Numpy, and Xgboost, or another open-source project.

Referring now to FIG. 2 and with continued reference to FIGS. 1A and 1B, shown is an illustrative workflow 200 for a model building process, in accordance with an embodiment of the present disclosure. In particular, workflow 200 is an illustrative process for building (or "providing") an ML ranking model (e.g., a multilayer perceptron (MLP)) for order prioritization engine 116. As shown, workflow 200 includes a modeling dataset creation phase 202, a dataset preprocessing phase 204, a dimensionality reduction phase 206, a model training and validation phase 208, and a model building phase 210.

In more detail, modeling dataset creation phase 202 can include collecting a corpus of order fulfillment data from which to generate a modeling dataset. The corpus of order fulfillment data can include information regarding the organization's historical product orders and their fulfillment and customer information. In one embodiment, one, two, or more years of historical order fulfillment data may be collected from which to create the modeling dataset. The amount of historical order fulfillment data to collect and use to create the modeling dataset may be configurable by the organization. For example, data collection module 112 can collect the corpus of order fulfillment data from the organization's various data sources, as previously described herein.

Dataset preprocessing phase 204 can include preprocessing the collected corpus of order fulfillment data to be in a form that is suitable for training a ranking-based ML algorithm (e.g., a pairwise ranking algorithm). For example, in one embodiment, natural language processing (NLP) algorithms and techniques may be utilized to preprocess the collected order fulfillment data (e.g., information regarding the organization's past product orders and their fulfillment and customer information). For example, the data preprocessing may include tokenization (e.g., splitting a phrase, sentence, paragraph, or an entire text document into smaller units, such as individual words or terms), noise removal (e.g., removing whitespaces, characters, digits, and items of text which can interfere with the extraction of features from the data), stopwords removal, stemming, and/or lemmatization.

The data preprocessing may also include placing the data into a tabular format. In the table, the structured columns represent the features (also called "variables") and each row represents an observation or instance (e.g., a particular product order that was fulfilled by the organization). Thus, each column in the table shows a different feature of the instance. The data preprocessing may also include placing the data (information) in the table into a format that is suitable for training a model. For example, since machine learning deals with numerical values, textual categorical values (i.e., free text) in the columns can be converted (i.e., encoded) into numerical values. According to one embodiment, the textual categorical values may be encoded using label encoding. According to alternative embodiments, the textual categorical values may be encoded using one-hot encoding or other suitable encoding methods.

The preliminary operations may also include null data handling (e.g., the handling of missing values in the table). According to one embodiment, null or missing values in a column (a feature) may be replaced by mean of the other values in that column. For example, mean imputation may be performed using a mean imputation technique such as that provided by Scikit-learn (Sklearn). According to alternative embodiments, observations in the table with null or missing values in a column may be replaced by a mode or median value of the values in that column or removed from the table.

The preliminary operations may also include feature selection and/or data engineering to determine or identify the relevant or important features from the noisy data. The relevant/important features are the features that are more correlated with the thing being predicted by the trained model (e.g., prioritization of product orders). A variety of feature engineering techniques, such as exploratory data analysis (EDA) and/or bivariate data analysis with multi-variate-variate plots and/or correlation heatmaps and dia-grams, among others, may be used to determine the relevant features. For example, the relevant features may include attributes of the historical product orders, attributes of the fulfillment of the historical product orders, and attributes of customers associated with the historical product orders.

Each instance in the table may represent a training/testing sample (i.e., an instance of a training/testing sample) in the modeling dataset and each column may be a relevant feature of the training/testing sample. As previously described, each training sample may correspond to a particular product order that was fulfilled by the organization. In a training/testing sample, the relevant features are the independent variables and the thing being predicted (e.g., a priority of a given product order) is the dependent variable (e.g., label). In some embodiments, the individual training/testing samples may be used to generate a feature vector, which is a multi-dimensional vector of elements or components that represent the features in a training/testing sample. In such embodiments, the generated feature vectors may be used for training or testing the ranking-based ML algorithm using supervised learning to make a prediction.

Dimensionality reduction phase 206 can include reducing the number of features in the dataset. For example, since the modeling dataset is being generated from the corpus of order fulfillment data, the number of features (or input variables) in the dataset may be very large. The large number of input features can result in poor performance for machine learning algorithms. For example, in one embodiment, dimensional-ity reduction techniques, such as principal component analy-sis (PCA), may be utilized to reduce the dimension of the modeling dataset (e.g., reduce the number of features in the dataset), hence improving the model's accuracy and perfor-mance. Examples of relevant features of a modeling dataset for the ML ranking model for order prioritization engine 116 is provided below with respect to FIG. 3.

Model training and validation phase 208 can include training and validating the ML ranking model using the modeling dataset. For example, various ranking-based ML algorithms such as a linear regression, multiple regression, RankNet, LambdaMART, and/or another suitable ranking-based algorithm, may be trained and tested. In one embodi-ment, the modeling dataset can be separated into two (2) groups: one for training the ML ranking model and the other for validating (or "evaluating") the ML ranking model. For example, based on the size of the modeling dataset, approxi-mately 80% of the modeling dataset can be designated for training the ML ranking model and the remaining portion (approximately 20%) of the modeling dataset can be desig-nated for validating or evaluating the ML ranking model. The model can then be trained by passing the portion of the modeling dataset designated for training (or "training data-set") and specifying a number of epochs. An epoch (one pass of the entire training dataset) is completed once all the observations of the training data are passed through the model. The model can be validated using the portion of the modeling dataset designated for validating (or "testing data-set") once the model completes a specified number of epochs. For example, the model can process the training dataset and a loss value (or "residuals") can be computed and used to assess the performance of the model. The loss value indicates how well the model is trained. Note that a higher loss value means the model is not sufficiently trained. In this case, hyperparameter tuning may be performed to choose the optimal parameter for the selected classification algorithm. For example, hyperparameter tuning may be performed using a grid search algorithm or other suitable tuning algorithm/technique that attempts to compute the optimum values of hyperparameters. Hyperparameter tuning allows the model to tune the performance based on the characteristics of the data and multiple combinations of model parameters (e.g., max depth, maxBins, stepSize, and subsampling rate). Once the loss is reduced to a very small number (ideally close to 0), the model is sufficiently trained for prediction.

Model selection phase 210 can include selecting an appro-priate ranking-based algorithm for building (or "generat-ing") the ML ranking model of order prioritization engine 116. A normalized discounted cumulative gain (nDCG) measure can be used to rank the quality of each ranking-based ML algorithm. In brief, nDCG is a measure of ranking quality that is commonly used to measure the effectiveness of search engine algorithms by ranking the documents according to their relevance in terms of the search keyword. The nDCG metric takes a value between 0 and 1, where 0 denotes incorrect order ranking and 1 denotes perfect order ranking. An nDCG for a ranking-based algorithm (e.g., linear regression, multiple regression, RankNet, LambdaMART, etc.) can be calculated as:

$$nDCG = \frac{DCG}{IDCG},$$

where DCG is the discounted cumulative gain and IDCG is the ideal discounted cumulative gain, and $$DCG = \sum_i n \frac{(true\ score)_i}{log_2(predicted\ rank_i + 1)}.$$

In the above expression, true score is the actual index of the order in the collection, and the predicted rank is the pre-dicted index of the order in the collection. The IDCG is equal to DCG if the order ranking is predicted perfectly.

According to one embodiment, a ranking-based algorithm may be selected for building the ML ranking model of order prioritization engine 116 based on accuracy of the ranking-based algorithm (e.g., based on the nDCG metric associated with the algorithm). For example, the ranking-based algo-rithm having the higher accuracy (e.g., higher nDCG metric) may be selected for building the ML ranking model of order prioritization engine 116. As another example, any one of the ranking-based algorithms whose nDCG metric satisfies a predetermined threshold nDCG metric, N (e.g., N=0.60, 0.65, 0.70, etc.), may be selected for building the ML ranking model of order prioritization engine 116. The value of N may be configurable by the organization.

Referring now to FIG. 3 and with continued reference to FIGS. 1A and 1B, shown is a diagram illustrating a portion of a data structure 300 that can be used to store information about relevant features of a modeling dataset for training a machine learning (ML) ranking model to prioritize input product orders, in accordance with an embodiment of the present disclosure. As can be seen, data structure 300 may be in a tabular format in which the structured columns represent the different relevant features (variables) regarding the his-torical order fulfillment data (e.g., the organization's his-torical product orders and their fulfillment and customer information) and a row represents individual historical prod-uct orders which were fulfilled. The relevant features illus-trated in data structure 300 are merely examples of features that may be extracted from the historical order fulfillment data of the organization and used to generate a modeling dataset and should not be construed to limit the embodiments described herein.

As shown in FIG. 3, the relevant features may include an order date 302, a dollar value 304, an order urgency 306, a profit margin 308, a follow-on order 310, an SLA fulfillment time 312, a penalty clause 314, a transportation time 316, an order fulfillment time 318, a promotional product 320, a product category 322, a type of product 324, a direct order 326, a customer credit hold 328, a customer net promoter score 330, a cost of goods sold in preceding four (4) quarters 332, a cost of goods sold profit margin 334, a customer association time 336, and a priority score 338. Order date 302 indicates the date on which the product order is received by the organization (e.g., a date on which the product order is entered into the organization's order management system). For example, different periods during the year may affect the prioritization of a product order. Dollar value 304 indicates the value of the product order (e.g., sales revenue associated with the product order). Order urgency 306 indicates an urgency (e.g., high, mid, low) associated with the product order. The order urgency of a product order may be agreed upon by the organization (e.g., sales associate) and the customer. Profit margin 308 indicates a profit margin (e.g., a percentage value) associated with the product order. Follow-on order 310 indicates whether the product order is a follow-on order (e.g., a product order resulting from a prior purchase made by the customer) or an independent order (e.g., not a follow-on order). For example, the organization may want to prioritize follow-on orders over independent orders.

SLA fulfillment time 312 indicates a time (e.g., a number of days) specified for fulfilling the product order. For example, the SLA associated with the product order may include a time which is agreed upon by the organization (e.g., sales associate) and the customer for fulfilling the product order. Penalty clause 314 indicates whether the SLA associated with the product order includes a penalty clause (e.g., "yes" or "no"). Transportation time 316 indicates an estimate of time (e.g., number of days) needed to transport the ordered product to the customer location. Order fulfillment time 318 indicates an estimate of time (e.g., number of days) needed to fulfill the product order (e.g., estimate of time needed to manufacture the ordered product). Promotional product 320 indicates whether the product is being purchased or acquired by the customer under a promotion (e.g., product is being purchased under a promotional program).

With continued reference to data structure 300, product category 322 indicates a point in the lifecycle (e.g., "new product", "normal product", "product near end-of-life", etc.) of the ordered product. For example, the organization may want to prioritize orders for new products over orders for products at or nearing the end of their life (e.g., products planned to be phased out). Type of product 324 indicates a type of product (e.g., "hardware", "software", "hardware/software", "service", etc.) that is being ordered. Direct order 326 indicates whether the customer directly ordered the product (e.g., customer purchased the product directly from the organization) or whether the customer ordered the via a sales associate (e.g., the organization's sales associate contacted the customer for the product order). Customer credit hold 328 indicates whether the customer has not exhausted any credit limit which was allocated to the customer by the organization (e.g., "no"=customer is within allocated credit) or whether the customer has exhausted the credit limit which was allocated to the customer by the organization (e.g., "yes"=customer has used all the allocated credit). For example, the organization may prioritize product orders from customers whose credit is not on hold (e.g., not exhausted) as compared to product orders from customers whose credit is on hold (e.g., exhausted). Customer net promoter score 330 indicates the customer's past experiences with the organization and whether the customer is likely to promote the organization. For example, a score of 9 to 10 may indicate that the customer is likely to promote the organization, a score of 7 to 8 may indicate that the customer is neutral with respect to promoting the organization, and a score below 6 may indicate that the customer is not likely to promote the organization. The organization may obtain this information from returned customer surveys, etc. Costs of goods sold in preceding four (4) quarters 332 indicates the value of the product orders (e.g., sales revenue) generated by the customer over the preceding four (4) quarters. For example, the organization may want to prioritize product orders from customer who are large revenue generators for the organization. Cost of goods sold profit margin 334 indicates a profit margin (e.g., a percentage value) associated with past product orders made by the customer. For example, the organization may want to prioritize product orders from customer who generate a larger profit margin for the organization. Customer association time 336 indicates a length of time (e.g., number of months/years) the customer has been dealing with the organization (e.g., a length of time the customer has been purchasing the organization's products).

Priority score 338 indicates a priority score associated with the product order. For example, in one implementation, for a given product order in the modeling dataset, a priority score may be specified by the organization at the time of creating the modeling dataset. For a given product order, the specified priority score may indicate an actual priority (or "ranking") of the product order relative to the other product orders in the modeling dataset.

In data structure 300, each row may represent a training/testing sample (i.e., an instance of a training/testing sample) in the modeling dataset, and each column may show a different relevant feature of the training/testing sample. In some embodiments, the individual training/testing samples may be used to generate a feature vector, which is a multi-dimensional vector of elements or components that represent the features in a training/testing sample. In such embodiments, the generated feature vectors may be used for training/testing an ML ranking model (e.g., a ranking-based algorithm for building the ML ranking model of order prioritization engine 116) to prioritize input product orders (e.g., prioritize product orders that need to be fulfilled). The features order date 302, dollar value 304, order urgency 306, profit margin 308, follow-on order 310, SLA fulfillment time 312, penalty clause 314, transportation time 316, order fulfillment time 318, promotional product 320, product category 322, type of product 324, direct order 326, customer credit hold 328, customer net promoter score 330, cost of goods sold in preceding four (4) quarters 332, cost of goods sold profit margin 334, and customer association time 336, may be included in a training/testing sample as the independent variables, and the feature priority score 338 included as the dependent variable (target variable) in the training/testing sample. The illustrated independent variables are features that influence performance of the ML ranking model (i.e., features that are relevant (or influential) in predicting a prioritization of input product orders).

FIG. 4 is a flow diagram of an example process 400 for ranking product orders for fulfillment based on a predicted prioritization of the product orders, in accordance with an embodiment of the present disclosure. Process 400 may be implemented or performed by any suitable hardware, or combination of hardware and software, including without limitation the components of network environment 100 shown and described with respect to FIGS. 1A and 1B, the computing device shown and described with respect to FIG. 5, or a combination thereof. For example, in some embodiments, the operations, functions, or actions illustrated in process 400 may be performed, for example, in whole or in part by data collection module 112 and order prioritization engine 116, or any combination of these including other components of order prioritization service 110 described with respect to FIGS. 1A and 1B.

With reference to process 400 of FIG. 4, at 402, historical order fulfillment data may be collected. The historical order fulfillment data can include information regarding an organization's historical product orders and their fulfillment and customer information. The collected historical order fulfillment data can be used to generate a modeling dataset for use in training and validating an ML ranking model to predict a prioritization of orders (e.g., customer orders). For example, data collection module 112 may collect the historical order fulfillment data from various data sources used by the organization to store or otherwise maintain such data.

At 404, an ML ranking model trained or configured using the modeling dataset generated from some or all of the collected historical order fulfillment data may be provided. For example, a ranking-based algorithm, such as a linear regression, multiple regression, RankNet, or LambdaMART, may be trained and tested using the modeling dataset to build the ML ranking model. For example, order prioritization engine 116 may train an ML ranking model. The trained ML ranking model can, in response to input of the organization's orders that need to be fulfilled, predict a prioritization of the orders.

At 406, information regarding product orders that need to be fulfilled may be received. For example, the information regarding product orders that need to be fulfilled may be received from an enterprise system (e.g., sales system 108) of the organization as part of a request (e.g., an inquiry) to prioritize the product orders.

In response to the information regarding product orders that need to be fulfilled being received, at 408, for each product order for which information is received, relevant feature(s) that influence prioritization of a particular product orders may be determined from the information received regarding the particular product order. For example, order prioritization engine 116 may perform the preliminary operations, such as null handling, feature selection, and/or data engineering, as previously described herein, to determine the relevant features of a particular product order from the information received regarding the particular product order.

At 410, a prioritization of the product orders may be predicted. The product orders for which a prioritization is predicted may be the product orders for which information is received at 408. The prioritization of the product orders may be predicted using the ML ranking model provided at 404. For example, for each product order for which a priority is to be predicted, order prioritization engine 116 may generate a feature vector that represents the relevant features determined from the information regarding the product order. Order prioritization engine 116 can then input the generated feature vectors (i.e., input the feature vectors that represent the relevant features of the product orders) to the ML ranking model, which outputs a prediction of the prioritization of the product orders.

At 412, information regarding the predicted prioritization of the product orders may be presented to a user. For example, order prioritization service 110 may send (or "transmit") the information regarding the predicted prioritization of the product orders to the enterprise system (e.g., sales system 108) as part of a response to the received request to prioritize the product orders. The enterprise system may then present the received information to the user as a recommended ranking of the product orders (e.g., recommendation of a ranking of the product orders for fulfillment by the organization).

At 414, the product orders may be ranked for fulfillment based on the predicted prioritization of the product orders. For example, the user can view the presented information at 412 and queue the product orders for fulfillment by the organization. For instance, in some cases, the product orders may be queued for fulfillment in accordance with the predicted prioritization of the product orders. In other cases, the product orders may be queued for fulfillment not in accordance with (i.e., different from) the predicted prioritization of the product orders. For example, the user may alter the priority of one or more product orders from the predicted priority and queue the product orders for fulfillment based on the altered prioritization.

Figure 5:
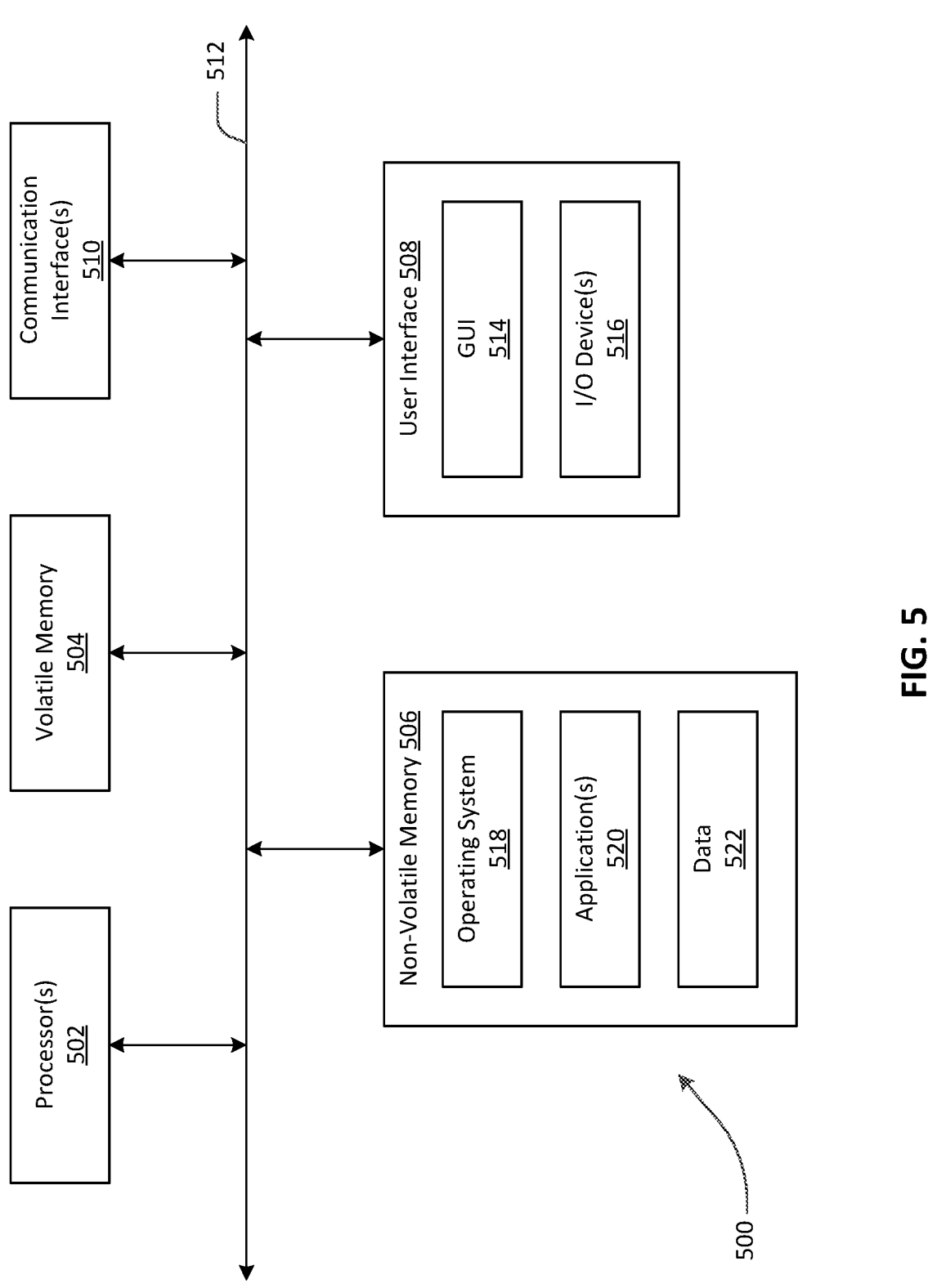
FIG. 5 is a block diagram illustrating selective components of an example computing device in which various aspects of the disclosure may be implemented, in accordance with an embodiment of the present disclosure.

FIG. 5 is a block diagram illustrating selective components of an example computing device 500 in which various aspects of the disclosure may be implemented, in accordance with an embodiment of the present disclosure. As shown, computing device 500 includes one or more processors 502, a volatile memory 504 (e.g., random access memory (RAM)), a non-volatile memory 506, a user interface (UI) 508, one or more communications interfaces 510, and a communications bus 512.

Non-volatile memory 506 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 508 may include a graphical user interface (GUI) 514 (e.g., a touchscreen, a display, etc.) and one or more input/output (I/O) devices 516 (e.g., a mouse, a keyboard, a microphone, one or more speakers, one or more cameras, one or more biometric scanners, one or more environmental sensors, and one or more accelerometers, etc.).

Non-volatile memory 506 stores an operating system 518, one or more applications 520, and data 522 such that, for example, computer instructions of operating system 518 and/or applications 520 are executed by processor(s) 502 out of volatile memory 504. In one example, computer instructions of operating system 518 and/or applications 520 are executed by processor(s) 502 out of volatile memory 504 to perform all or part of the processes described herein (e.g., processes illustrated and described in reference to FIGS. 1 through 4). In some embodiments, volatile memory 504 may include one or more types of RAM and/or a cache memory that may offer a faster response time than a main memory. Data may be entered using an input device of GUI 514 or received from I/O device(s) 516. Various elements of computing device 500 may communicate via communications bus 512.

The illustrated computing device 500 is shown merely as an illustrative client device or server and may be implemented by any computing or processing environment with any type of machine or set of machines that may have suitable hardware and/or software capable of operating as described herein.

Processor(s) 502 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 502 may be analog, digital or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 510 may include one or more interfaces to enable computing device 500 to access a computer network such as a Local Area Network (LAN), a Wide Area Network (WAN), a Personal Area Network (PAN), or the Internet through a variety of wired and/or wireless connections, including cellular connections.

In described embodiments, computing device 500 may execute an application on behalf of a user of a client device. For example, computing device 500 may execute one or more virtual machines managed by a hypervisor. Each virtual machine may provide an execution session within which applications execute on behalf of a user or a client device, such as a hosted desktop session. Computing device 500 may also execute a terminal services session to provide a hosted desktop environment. Computing device 500 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
building a machine learning (ML model) by:
   generating, by an order prioritization service, a modeling dataset from a corpus of historical order fulfillment data from a plurality of orders from a plurality of customers using a natural language process;
   implementing through a deep neural network, by an order prioritization service, one of a pairwise ranking process and a pointwise ranking process, wherein, when implementing the pairwise ranking process, the deep neural network takes as input features of two different orders and outputs a respective priority score for each of the two orders;
   training, by the order prioritization service, the deep neural network to predict priority scores for orders to be fulfilled using a plurality of training samples, each training sample generated from modeling dataset, each training sample of the plurality of training samples to adjust weights in the deep neural network, wherein training the deep neural network includes inputting different portions of the modeling dataset and comparing predictions of customer actions with target values of the training samples to adjust weights in the deep neural network;
receiving, by the order prioritization service, information regarding a plurality of orders that need to be fulfilled;
determining, by the order prioritization service, for each one of the plurality of orders, one or more relevant features from the information regarding the order, the one or more relevant features influencing prediction of an order priority;
generating, by the order prioritization service, a feature vector that represents the one or more relevant features;
inputting, by the order prioritization service, the feature vector to the ML model;
predicting, by the order prioritization service using the ML model, a priority score for each one of the plurality of orders based on the determined one or more relevant features;
ranking, by the order prioritization service, the plurality of orders based on their respective priority scores; and
queuing, by the order prioritization service, the plurality of orders based on the ranking.

2. The method of claim 1, wherein the deep neural network includes a multilayer perceptron (MLP).

3. The method of claim 1, wherein the deep neural network is trained using supervised learning with the historical order fulfillment data including an actual priority of each order.

4. The method of claim 1, wherein the pairwise ranking model includes a gradient boosting forest.

5. The method of claim 1, wherein the pointwise ranking model includes one of a linear regression model or a multiple regression model.

6. A system comprising:
one or more non-transitory machine-readable mediums configured to store instructions; and
one or more processors configured to execute the instructions stored on the one or more non-transitory machine-readable mediums, wherein execution of the instructions causes the one or more processors to carry out a process comprising:
   building a machine learning (ML model) by:
      generating a modeling dataset from a corpus of historical order fulfillment data from a plurality of orders from a plurality of customers using a natural language process;
      implementing through a deep neural network one of a pairwise ranking process and a pointwise ranking process wherein, when implementing the pairwise ranking process, the deep neural network takes as input features of two different orders and output a respective priority score for each of the two orders;
      training the deep neural network to predict priority scores for orders to be fulfilled using a plurality of training samples, each training sample generated from modeling dataset, each training sample of the plurality of training samples to adjust weights in the deep neural network, wherein training the deep neural network includes inputting different portions of the modeling dataset and comparing predictions of customer actions with target values of the training samples to adjust weights in the deep neural network;
   receiving information regarding a plurality of orders that need to be fulfilled;
   determining, for each one of the plurality of orders, one or more relevant features from the information regarding the order, the one or more relevant features influencing prediction of an order priority;
   generating a feature vector that represents the one or more relevant features;
   inputting the feature vector to the ML model;
   predicting, using the ML model, a priority score for each one of the plurality of orders based on the determined one or more relevant features;
   ranking the plurality of orders based on their respective priority scores;
   queuing the plurality of orders based on the ranking.

7. The system of claim 6, wherein the deep neural network includes a multilayer perceptron (MLP).

8. The system of claim 6, wherein the deep neural network is trained using supervised learning with the historical order fulfillment data including an actual priority of each order.

9. The system of claim 6, wherein the pairwise ranking model includes a gradient boosting forest.

10. The system of claim 6, wherein the pointwise ranking model includes one of a linear regression model or a multiple regression model.

11. A non-transitory machine-readable medium encoding instructions that when executed by one or more processors cause a process to be carried out, the process including:

building a machine learning (ML model) by:

generating a modeling dataset from a corpus of histori-cal order fulfillment data from a plurality of orders from a plurality of customers using a natural lan-guage process;

implementing through a deep neural network at least one of a pairwise ranking process and a pointwise ranking process wherein, when implementing the pairwise ranking process, the deep neural network takes as input features of two different orders and outputs a respective priority score for each of the two orders;

training the deep neural network to predict priority scores for orders to be fulfilled using a plurality of training samples, each training sample generated from modeling dataset, each training sample of the plurality of training samples to adjust weights in the deep neural network, wherein training the deep neu-ral network includes inputting different portions of the modeling dataset and comparing predictions of customer actions with target values of the training samples to adjust weights in the deep neural net-work;

receiving information regarding a plurality of orders that need to be fulfilled;

determining, for each one of the plurality of orders, one or more relevant features from the information regarding the order, the one or more relevant features influencing prediction of an order priority;

generating a feature vector that represents the one or more relevant features;

inputting the feature vector to the ML model;

predicting, using the ML model, a priority score for each one of the plurality of orders based on the determined one or more relevant features;

ranking the plurality of orders based on their respective priority scores queuing the plurality of orders based on the ranking.

12. The machine-readable medium of claim 11, wherein the deep neural network is trained using supervised learning with the historical order fulfillment data including an actual priority of each order.

13. The machine readable medium of claim 11 wherein the process further comprises:

implementing a pairwise ranking process and a pointwise ranking process;

generating a normalized discounted cumulative gain mea-sure for each of the pairwise ranking process and the pointwise ranking process;

selecting one of the pairwise ranking process and the pointwise ranking process based on the normalized discounted cumulative gain measure; and implementing the selected one of the pairwise ranking process and the pointwise ranking process through the deep neural network.

14. The machine readable medium of claim 13 wherein selecting one of the pairwise ranking process and the point-wise ranking process is based on a highest normalized discounted cumulative gain measure.

15. The machine readable medium of claim 13 wherein selecting one of the pairwise ranking process and the point-wise ranking process is based on the normalized discounted cumulative gain measure satisfying a predetermined thresh-old.

* * * * *